(12) United States Patent
Lund et al.

(10) Patent No.: US 7,266,834 B1
(45) Date of Patent: Sep. 4, 2007

(54) SHARING FUNCTIONS BETWEEN A TELEVISION-BASED INFORMATION APPLIANCE AND REMOTE CONTROL DEVICES

(75) Inventors: Arnold M. Lund, Louisville, CO (US); Troy C. Beecroft, Westminster, CO (US)

(73) Assignee: Qwest Communications International, Inc., Denver, CO (US)

( * ) Notice: Subject to any disclaimer, the term of this patent is extended or adjusted under 35 U.S.C. 154(b) by 1509 days.

(21) Appl. No.: 09/596,973

(22) Filed: Jun. 20, 2000

(51) Int. Cl.
*G06F 13/00* (2006.01)
*H04N 7/173* (2006.01)

(52) U.S. Cl. .............................. 725/47; 725/40; 725/49; 725/106; 725/153

(58) Field of Classification Search ................ 725/141, 725/133, 153, 39–61, 28, 29, 106; 348/734, 348/14.01, 14.02, 563; 455/415; 379/88.21, 379/211.02; 715/810
See application file for complete search history.

(56) References Cited

U.S. PATENT DOCUMENTS

| | | | | |
|---|---|---|---|---|
| 4,392,022 A | * | 7/1983 | Carlson | ...................... 348/552 |
| 4,508,935 A | * | 4/1985 | Mastromoro | ................ 455/420 |
| 5,138,649 A | * | 8/1992 | Krisbergh et al. | .......... 455/420 |
| 5,671,267 A | * | 9/1997 | August et al. | .............. 455/420 |
| 5,963,624 A | * | 10/1999 | Pope | ..................... 379/110.01 |
| 6,292,172 B1 | * | 9/2001 | Makhlouf | .................... 345/157 |
| 6,292,210 B1 | * | 9/2001 | Gerszberg et al. | ........ 348/14.01 |
| 6,411,891 B1 | * | 6/2002 | Jones | ......................... 701/201 |
| 6,516,467 B1 | * | 2/2003 | Schindler et al. | ........... 725/153 |
| 6,567,984 B1 | * | 5/2003 | Allport | ...................... 725/110 |
| 6,570,974 B1 | * | 5/2003 | Gerszberg et al. | ..... 379/218.01 |

* cited by examiner

*Primary Examiner*—Kieu-Oanh Bui
(74) *Attorney, Agent, or Firm*—Townsend and Townsend and Crew LLP

(57) ABSTRACT

In an information system, caller identification information for incoming telephone calls can be selectively displayed on displays at any of the set top box, television, remote or keyboard. Further, microphones and speakers on each of the remote control and keyboard can be used for communication on a telephone call, at the user's option, in place of a microphone on the main unit and a television speaker.

17 Claims, 3 Drawing Sheets

US 7,266,834 B1

SHARING FUNCTIONS BETWEEN A TELEVISION-BASED INFORMATION APPLIANCE AND REMOTE CONTROL DEVICES

BACKGROUND OF THE INVENTION

The present invention relates to a television-based information appliance.

An existing television-based information appliance includes a set-top box providing a television signal (such as subscription television), internet access and telephone service to a television. The set top box includes a microphone for communicating over the telephone line. If a telephone call is received on a telephone line while the user is watching television and/or on the internet, the caller identification information is displayed on the television. If the user chooses to take the call (by pressing a button on the remote), the set top box and television work together as a speaker phone. The user speaks into the microphone on the set top box and hears the call through the speaker (or speakers) on the television.

The existing television based information appliance also provides internet access and e-mail. A wireless keyboard communicates with the set top box to enter characters, which are displayed on the television. For example, the user can draft e-mail by typing on the keyboard to produce characters on the television. The e-mail is then sent by the set top box via the telephone line or other internet connection.

The current system lacks flexibility in several areas. First, the caller identification information can only be displayed on the television, interrupting the program the user is currently watching. Further, if the user wishes to take the call, the user must use the microphone on the set top box and the speaker on the television, greatly reducing the privacy of the call.

SUMMARY OF THE INVENTION

The present invention provides an information system with improved flexibility. In the information system on the present invention, the user selects where the caller identification information is to be displayed. For example, the user can select the caller identification information to be displayed on the remote, on the set top box, on the keyboard, and/or on the television. Further, in the present invention, the remote and keyboard are each provided with a speaker and microphone for telephone communication via the information system. The user can select which of the microphones to use (i.e. the remote, the keyboard or the set top box). The user can also select which of the speakers to use (i.e., the remote, the keyboard, or the television). In this manner, the remote input devices (the remote control and the keyboard) can function as cordless telephone handsets.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF A PREFERRED EMBODIMENT

Figure 1:
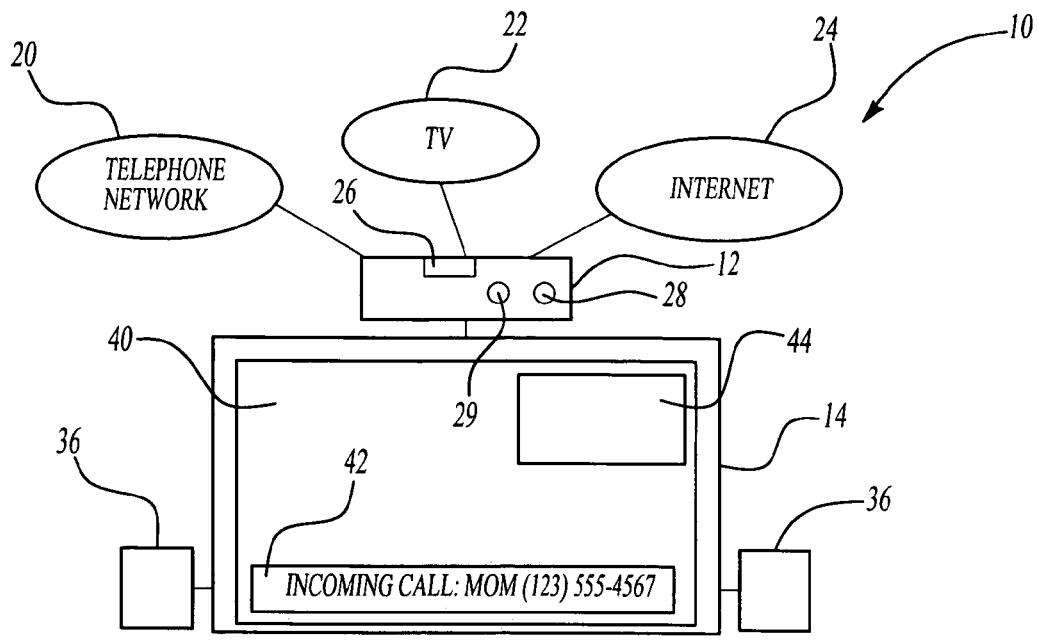
FIG. 1 is a schematic of the information system of the present invention.
Figure 1:
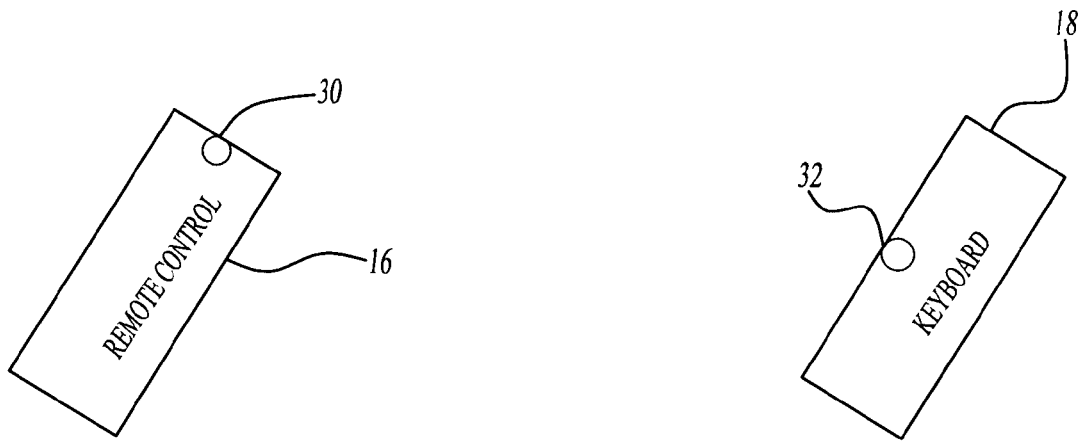

FIG. 1 schematically illustrates the information system 10 of the present invention. The information system 10 includes a set-top box or main unit 12, a display 14, a wireless remote control 16 and a wireless keyboard 18.

The main unit 12 is connected to a telephone network 20, television source 22 and internet 24. The telephone network 20, television source 22 and internet 24 may be provided on a single subscriber line, or via multiple lines to the main unit 12. The main unit 12 includes a television tuner 26, which may include a decoder for subscription television, such as cable television, digital cable television, satellite television or digital satellite television. The main unit 12 further includes a wireless communication transceiver 28 which communicates with complementary transceivers 30 and 32 on the remote control 16 and wireless keyboard 18, respectively. The transceivers 28, 30, 32 can be RF, infrared, or any known wireless communication technology. The main unit 12 further includes a microphone 29 for communication on the telephone network 20.

The display 14 may be any television or monitor (i.e., with or without a tuner). Further, the display 14 may include integrated or component speakers 36. The display 14 includes a first display area 40 which displays a video signal received from the main unit 12. Utilizing known hardware and software in the main unit 12, the first display area 40 may be separated to include separate display areas 42, 44 for displaying information from different sources. For example, display area 42 may be a pop-up display area which pops up and provides caller identification information received by the main unit 12 from the telephone network 20. The display area 44 may operate similar to picture-in-picture to provide a video signal from the television source 22, while internet web pages from internet 24 are displayed in first display area 40 (or vice versa). Selection of the different display areas and different sources 20, 22, 24 is performed by the remote control 16 and/or keyboard 18. The wireless keyboard 18 is also used for creating and sending e-mail messages displayed on display 14 and sent by the main unit 12 via the internet 24.

When an incoming call is detected by the main unit 12 on the telephone network 20, caller identification information is displayed in display area 42. Then, utilizing either of the input devices (the remote control 16 or keyboard 18), the user can choose whether or not to take the call. If the user elects to take the call, the information system 10 operates as a speaker phone, utilizing the microphone 29 and the main unit 12 and the speakers 36 associated with the display 14.

The features of the information system 10 that have been described above are known. The inventive features of the information system 10 of the present invention will be described below with more detailed views of the main unit 12, remote control 16 and wireless keyboard 18 in FIGS. 2-4, respectively, and one possible menu to be displayed on display 14 in FIG. 5.

Figure 2:
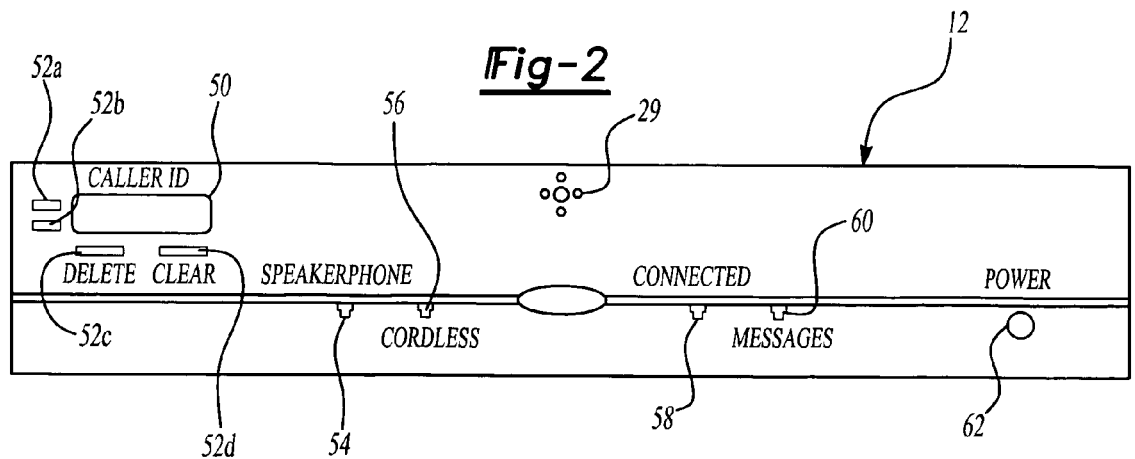
FIG. 2 is a more detailed view of the face of the main unit of FIG. 1.

A more detailed view of the face of main unit 12 is shown in FIG. 2. According to one feature of the present invention, the main unit 12 further includes a caller identification display 50 on the face of the main unit 12. The main unit 12 further includes a few user input buttons 52a-d for operating the caller identification function. The main unit 12 further includes indicators, including a "speaker phone" indicator 54 indicating when the information system 10 is operating as a speaker phone and a "cordless" indicator 56 indicating when the information system 10 is operating as a cordless phone system. The main unit 12 further includes a "connected" indicator 58 indicating when the main unit 12 is connected to the internet 24 and a "messages" indicator 60 indicating when there are telephone and/or e-mail messages waiting for the user. The main unit 12 further includes a power button 62.

Figure 3:
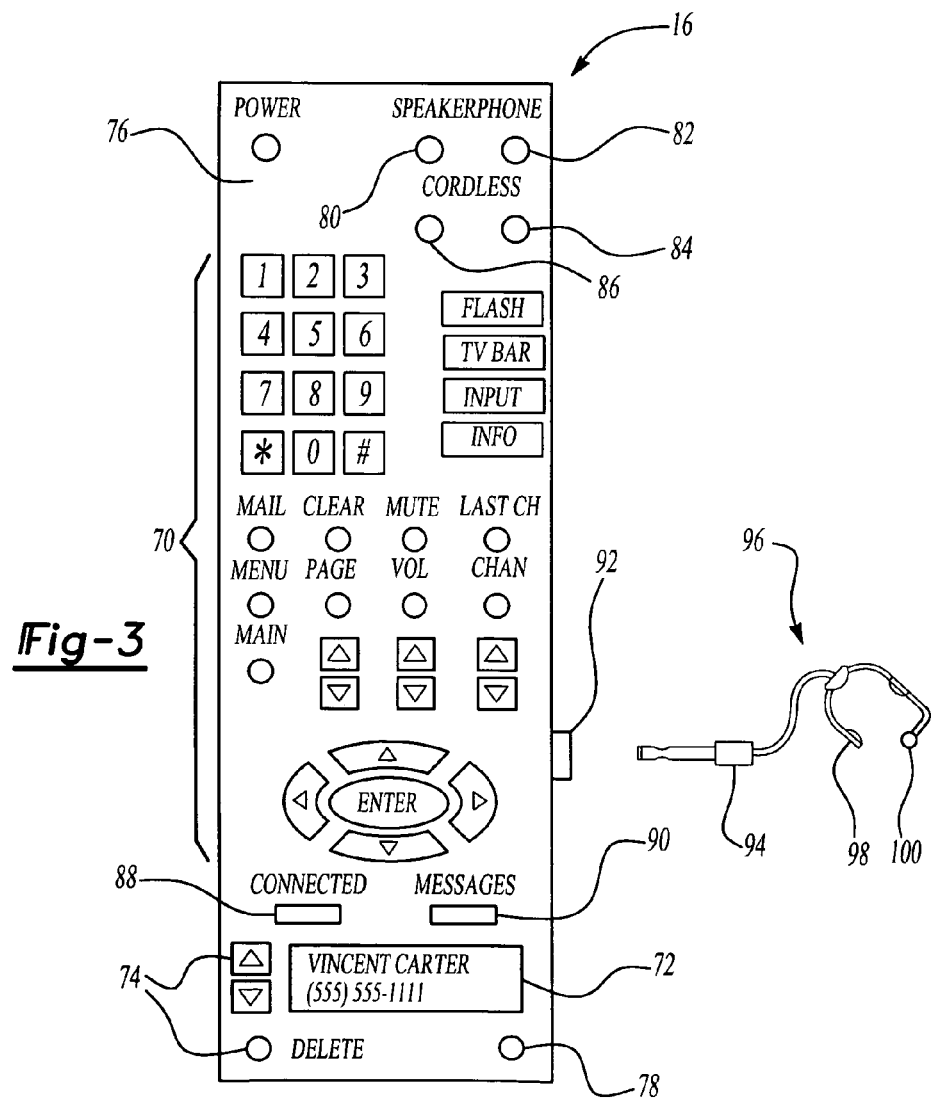
FIG. 3 is a more detailed view of the remote control of FIG. 1.

FIG. 3 is an enlarged view of the remote control 16 of FIG. 1. The remote control 16 includes a plurality of user input devices 70, such as buttons for selecting channels of the television source 22 and for navigating menus provided by the main unit 12 for accessing the telephone network 20 and internet 24.

According to one feature of the present invention, the remote control 16 includes a caller identification display 72 and user input buttons 74 for operating the caller identification function. According to another feature of the present invention, the remote control 16 further includes audio transducers, namely a speaker 76 and microphone 78, preferably toward opposite ends of the remote control 16 so that the remote control 16 can operate as a handset for a cordless telephone system.

The remote control 16 further includes a button 80 for placing the information system 10 in speaker phone mode and an associated status indicator 82. The remote control 16 further includes a button 84 for placing the information system 10 in cordless telephone mode and an associated status indicator 86. A "connected" indicator 88 indicates when the user is connected to the internet and a "messages" indicator 90 indicates when the user has new voice or email messages.

Preferably, the remote control 16 includes a headset jack 92 for receiving a jack 94 from a headset 96. The headset 96 includes a earphone 98 and microphone 100 which, when connected, provide communication for the telephone in place of the microphone 78 and speaker 76 built permanently into the remote 16.

Figure 4:
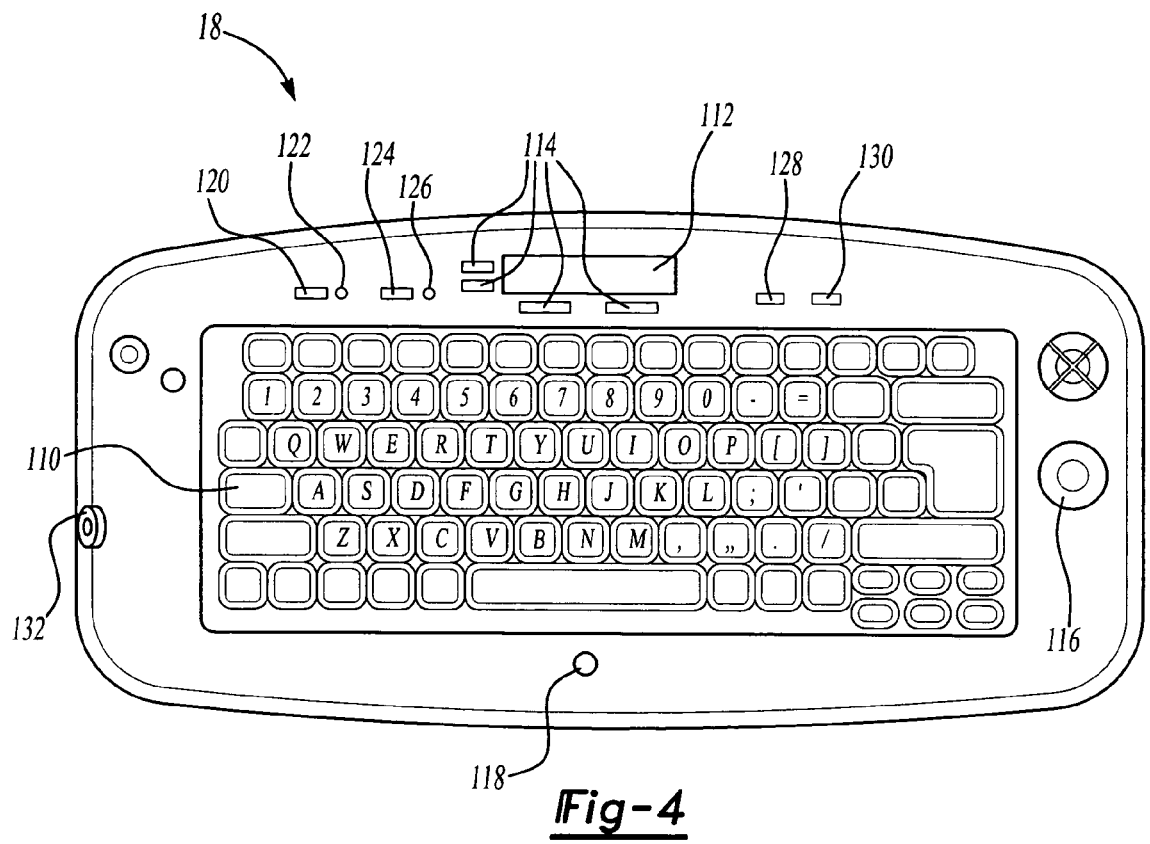
FIG. 4 is a more detailed view of the keyboard of FIG. 1.

FIG. 4 is an enlarged view of the wireless keyboard 18 of FIG. 1. In the present invention, the wireless keyboard 18 is also provided with the features described above with respect to the remote 16. The wireless keyboard 18 includes a plurality of user input devices, such as keys or buttons for entry of characters and other functions and for navigating menus provided by the main unit 12 for access in the telephone network 20 and internet 24. The wireless keyboard 18 includes a caller identification display 112 and user input buttons 114 for operating the caller identification function. The wireless keyboard 18 further includes audio transducers, namely a speaker 116 and microphone 118.

The wireless keyboard 18 further includes a button 120 for placing the information system 10 in speaker phone mode and an associated status indicator 122. The wireless keyboard 18 further includes a button 124 for placing the information system 10 in cordless telephone mode (with the keyboard 18 as the "handset") and an associated status indicator 126. A "connected" indicator 128 indicates when the user is connected to the internet and a "messages" indicator 130 indicates when the user has new voice or email messages. Preferably, the wireless keyboard 18 includes a headset jack 132 for receiving the jack 94 from the headset 96 (FIG. 3).

Figure 5:
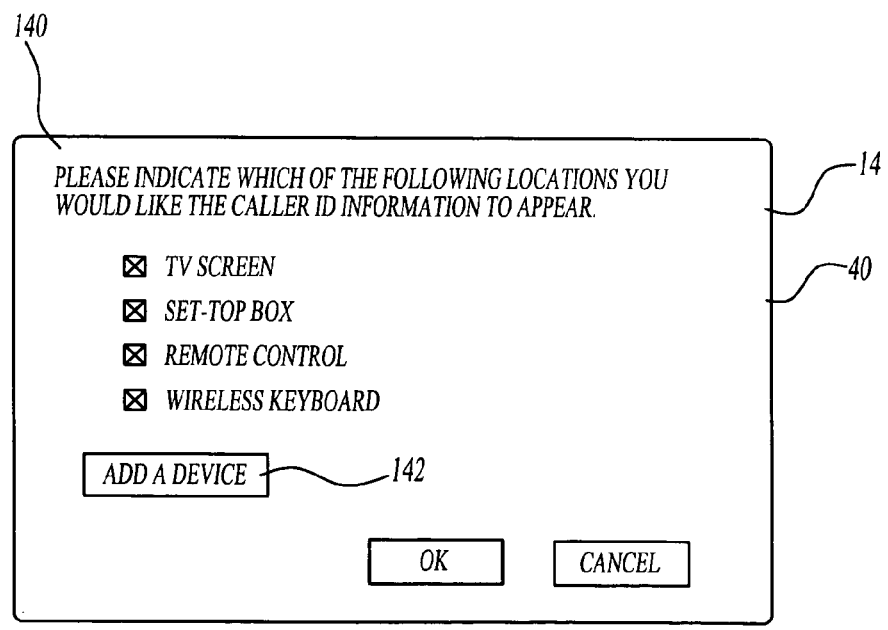
FIG. 5 illustrates one possible menu which can be displayed on the display of FIG. 1.

FIG. 5 illustrates a menu 140 displayed on the display 14 by the main unit 12 to provide a plurality of options for the user as to where the caller identification information will be displayed. As can be seen in FIG. 5, the caller identification information can be displayed in any or all of the TV screen (display 40 in FIG. 1), set top box caller identification display 50 (FIG. 2), remote display 72 (FIG. 3) and/or wireless keyboard display 112 (FIG. 4). The user also has the option 142 of adding additional devices, should additional devices become available.

In operation, information from the television source 22 and internet 24 are displayed on the first display area 40 and/or display area 44 as selected by the user according to the known system. Also, in the present invention, using the menu 140 of FIG. 5, the user selects the displays for the caller identification information to be displayed. When an incoming call from telephone network 20 is detected by the main unit 12, the caller identification information is then displayed on the selected displays. For example, if the user selects all of the displays as shown in FIG. 5, the caller identification information will be displayed on the display 14 in display area 42, in display 50 on main unit 12, in display 72 on remote 16 and on display 112 on keyboard 18.

If the user takes the call, the user can choose to take the call in any of several different ways. First, the user can communicate on the telephone call via the microphone 29 on the main unit 12 and speakers 36 on display 14, as is done in the known system (FIG. 1).

In the present invention, the user can also choose to use the remote control 16 as a cordless telephone handset by pressing the "cordless" button 84 on the remote 16 (FIG. 3). The user would hear the call through the speaker 76 on the remote 16 and speak into the microphone 78 on the remote 16. The audio transducers 76, 78 communicate wirelessly with the main unit 12 for telephone communication such as through transceivers 26, 30 or a separate set of wireless transceivers. This increases the privacy of the call over the known system. Alternatively, the user can take the call over the wireless keyboard 18, where the corresponding components would provide identical features.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. Alphanumeric labels on method steps in the claims below are for convenience of reference by dependent claims, and do not signify a required order of performance of the method steps.

What is claimed is:

1. An information system comprising:

a display;

a video source sending video to be displayed on the display;

a remote generating a wireless signal for controlling the video source, the remote including a caller identification display for displaying caller identification information and at least one of a microphone and a speaker for telephone communication;

a menu to be displayed on the display, the menu including a plurality of options for a user to select one or more locations to display caller identification information, one of the options comprising displaying the caller identification information on the remote.

2. The information system of claim 1 wherein the remote is a wireless keyboard.

3. The information system of claim 1 wherein the remote selectively generates a wireless signal for changing the video to the display.

4. The information system of claim 1 wherein the remote includes the microphone and the speaker.

5. The information system of claim 1 further including a telephone base unit in wireless communication with the remote.

6. The information system of claim 5 wherein the telephone base unit is in communication with a telephone network.

7. The information system of claim 1 wherein the video source is a subscription television decoder.

8. The information system of claim 1 wherein the video source is a main unit providing video and telephone communication.

9. The information system of claim 8 wherein the main unit includes a subscription television decoder.

10. The information system of claim 9 wherein the main unit includes an internet connection.

11. A method for operating an information system including a display and a remote, the method including the steps of:
    a) displaying video on the display;
    b) providing an option to display caller identification information on the display and providing a second option to display caller identification information on the remote;
    c) receiving a user selection to display the caller identification information on a selected one of the display or the remote;
    d) determining that a telephone call is incoming to the information system;
    e) receiving caller identification information from the incoming call; and
    f) displaying the caller identification information on the selected one of the display or the remote.

12. The method of claim 11 further including the step of transmitting the caller identification information to the remote prior to said step f).

13. The method of claim 12 wherein said step f) further includes the step of displaying the caller identification information on the remote.

14. The method of claim 11 further including the step of controlling the video on the display by sending a wireless signal from the remote.

15. The method of claim 11, further comprising:
    a) changing the video on the display with a wireless remote; and
    b) communicating on the telephone call via an audio transducer on the remote.

16. The method of claim 15 further including the steps of:
    a) providing an option to provide communication via the audio transceiver on the remote or an audio transceiver on the display; and
    b) receiving a selection of one of the remote or display in response to said providing the option; and
    c) communicating on the telephone call via the selected one of the audio transceiver on the display or the remote.

17. A remote input device for an information system comprising:
    at least one user input device;
    a transmitter for generating a wireless signal for controlling an information system component based upon activation of the at least one user input device;
    a receiver for receiving a wireless signal including caller identification information received from a telephone system; and
    a display for displaying the caller identification information received via the transceiver, wherein the display displays the caller identification information based on a user option configuring the display location of the caller identification information.

* * * * *